United States Patent [19]

Lindberg et al.

[11] Patent Number: 4,695,019
[45] Date of Patent: Sep. 22, 1987

[54] NON-METALLIC STRUT SYSTEM

[75] Inventors: Verne L. Lindberg, Everett; Paul A. Stockinger, Tacoma, both of Wash.

[73] Assignee: Aickin Development Corporation, Everett, Wash.

[21] Appl. No.: 912,963

[22] Filed: Sep. 26, 1986

Related U.S. Application Data

[63] Continuation-in-part of Ser. No. 743,102, Jun. 10, 1985.

[51] Int. Cl.⁴ .................................................. F16L 3/03
[52] U.S. Cl. .................................. 248/74.3; 24/274 R; 24/618; 248/62
[58] Field of Search ............... 248/74.3, 74.4, 74.2, 248/63, 73, 62, 65, 58; 24/274 R, 284, 625, 618

[56] References Cited

U.S. PATENT DOCUMENTS

| | | | |
|---|---|---|---|
| 3,088,702 | 5/1963 | Orenick et al. | 248/74.3 X |
| 3,226,069 | 12/1965 | Clarke | 248/73 |
| 3,527,432 | 9/1970 | Lytle | 248/62 |
| 3,650,499 | 3/1972 | Biggane | 248/62 |
| 3,721,750 | 3/1973 | Countryman | 24/16 PB X |
| 3,913,187 | 10/1974 | Okuda | 248/74.3 X |
| 3,933,377 | 1/1976 | Arrowood | 248/62 X |
| 3,950,830 | 4/1976 | Duprez | 24/274 R |
| 4,021,892 | 5/1977 | Piper | 24/274 R |
| 4,061,299 | 12/1977 | Kurosaki | 248/73 |
| 4,197,620 | 4/1980 | Heuchert | 24/274 R |
| 4,221,030 | 9/1980 | Bernede | 24/274 R |
| 4,307,495 | 12/1981 | Sadler | 24/274 R |
| 4,371,137 | 2/1983 | Anscher | 248/73 |
| 4,417,711 | 11/1983 | Madej | 248/74.4 |

Primary Examiner—Ramon O. Ramirez
Attorney, Agent, or Firm—Mark Zovko

[57] ABSTRACT

A non-metallic strut support system using a fiberglass channel and composite thermoplastic bands to support piping or ducting used in corrosive environments. The structural strut has a pair of longitudinal flanges which project inwardly. Complimental composite thermoplastic support bands are provided which have a natural curvature for supporting a pipe or duct when the bands are engaged. The bands have flanges on their top portion which engage the flanges of the structural strut when the top portion of the bands are placed within the channel of the strut. The top portion of the bands provides easy insertion and removal of the bands from the strut channel manually, either by inserting and turning to fit in the lock position, or in close clearance areas the head can be compressed to provide snap-in placement into the strut. The bands are adjusted by a bolt in a housing on the end of one band and matching slots on the end of the other band. The bolt and slots are threadably engaged and the bolt is driven until the desired tightness around the pipe or duct is achieved.

1 Claim, 4 Drawing Figures

U.S. Patent   Sep. 22, 1987   4,695,019 ic support bands having a bottom portion which forms
a natural curvature for cradling a pipe when the ends of
the bands are engaged. The bands also have a top por-

NON-METALLIC STRUT SYSTEM

CROSS REFERENCE TO RELATED APPLICATION

This application is a continuation-in-part of our copending application Ser. No. 743,102, filed 6/10/85.

BACKGROUND OF THE INVENTION

1. Field of the Invention

This invention relates in general to strut framing systems and more particularly to a non-metallic, corrosion resistant framing and mechanical support system for the processes of the corrosive industries.

2. Discussion of the Prior Art

Strut framing systems have been widely used in the U.S.A. as well as internationally for nearly fifty years. However, the advent of high technology manufacturing processes during the last decade has resulted in numerous requirements for more state-of-the-art mechanical support systems. Many attempts have been made by the historical suppliers of strut systems to meet the demands of new industries, but most attempts were based on the basic industry out of which the strut systems have developed. Various grades of stainless steel strut and fasteners have been developed and are available at extremely high costs. Plated and coated steel systems have been developed from galvanizing epoxy to PVC coatings. More recently, several fiberglass strut channels have been introduced, however, their struts are designed for metallic or metallic coated fastener systems.

The strut systems of the present invention are all non-metallic, corrosion resistant framing and mechanical supports for the processes of the corrosive industries. The present invention combines two plastics design and manufacturing methods to produce a mechanical support and attachment system using all non-metallic components.

The structural strut is a specially designed fiberglass pultruded shape incorporating the use of composite structure design with a highly efficient mechanical shape to produce the strongest and stiffest support for the fastener system. The fasteners are designed of high strength composite thermoplastics and are injection molded in two halves. Their shape allows attachment to the strut support without tools, and the position locking connection provides a permanent but adjustable locking support of the process piping or ducting.

Prior to the filing of the present invention, a preliminary patent search of the prior art was performed. The following patents were found and are listed below:

| U.S. Pat. No. | Inventor | Issue Date |
| --- | --- | --- |
| 3,088,702 | Orenick, et al | 5/7/63 |
| 3,527,432 | Lytle | 9/8/70 |
| 3,721,750 | Countryman | 3/20/73 |
| 3,913,187 | Okuda | 10/21/74 |
| 4,061,299 | Kurosaki | 12/6/77 |
| 4,371,137 | Anscher | 2/1/83 |

Perhaps the patent of most interest from this group is U.S. Pat. No. 3,527,432 issued to Lytle. Lytle shows a longitudinal channel with retaining flange for holding clamping plates which are curved to accommodate pipe or tubing. The plates are hooked to the flanges in the channel. The ends adjacent to the curved portions of the clamping plates are formed into parallel flanges with registering holes to accommodate a threaded fastener so that the clamping plates can be tightened onto the pipe. To facilitate insertion of the plates over the pipe and into the channel, one of the clamping plates is provided with two opposite hanging hooks on opposite edges, and the other plate is provided with one hanging hook. The present invention differs in many respects from Lytle. The means of holding the bands of the present invention in the flanges of the channel is different; the means of fastening and holding the pipe or duct is different; also, the bands used in the present invention are much different than Lytle's plates both in structure and result. Further, Lytle does not contemplate use of his support system, in a corrosive application.

U.S. Pat. No. 3,721,750 issued to Countryman shows a plastic strapping fastener. It is much different than the present invention in structure and function. The other patents found in the search relate to the general area of fastening systems, but in applicant's opinion, either alone or in combination, do not disclose the key elements of applicant's invention as disclosed herein.

A patent that became a key reference to the parent of this application was by Clark (U.S. Pat. No. 3,226,069 issued 12/28/65). Applicant would like to point out a key and critical distinction between Clarke and their invention. It lies in the top portion of the support bands and more specifically in the contact between the flanges on the hangar and the flanges on the support element. Applicant is aware that merely changing Clarke's hangars and support element to thermoplastic and/or fiberglass would not result in patentability. If this were done, Clarke's invention duplicated in plastic and/or fiberglass would fail due to tensilve load concentrations at points in his anchors 26 and flanges 22. Clarke's system relies on point and line contact of the anchors 26 and flanges 22, and suggests the use of ear 26b if flanges 24 are rounded, and ear 26a if flanges are straight. (See Clarke, col 3, lines 9–18). In metal, this point and line contact would be acceptable and support the required weight, since metal has sufficient tensile strength to resist the tendency to bend the anchors 26 whether they are shaped as in 26a or 26b, and whether flanges 22 are rounded or straight. Stress concentration would occur in ear shape 26a at the point which the ear 26a meets the medial portion 26c, and in ear shape 26b similarly at the points where the ear 26b changes direction, and at its tip. In either case, flange 24 whether rounded or straight would experience tensile stress due to bending where the flange 24 meets the sides of support 10. Clarke's anchors 26 and flanges 24 are typical of what is conventionally available in the metal hangar art. This system if duplicated in plastic and/or fiberglass would fail when the conventionally required loads were placed upon it. A more comprehensive interface between the support element and hangar is needed, which is supplied by applicants' invention.

SUMMARY OF THE INVENTION

The present invention is a strut support system for piping, tubing or ducting which includes first, a structural support channel having a longitudinal slot. The support channel also has longitudinal flanges along the sides of the slot inwardly projecting toward the centerline of the support channel. The present invention also provides a pair of complemental composite thermoplastic support bands having a bottom portion which forms a natural curvature for cradling a pipe when the ends of the bands are engaged. The bands also have a top portion with two support members having distal flanges capable of engaging the longitudinal flanges of the slot in the support channel when the top portion of the bands is disposed within the longitudinal slot of the support channel. The two support members of the top portion of the support bands are resilient and permit easy manipulation of the bands for insertion into the slot or for removal from the slot. The bottom portion of the bands has adjustable holding means for connecting and locking the support bands around a pipe. This adjustable holding means preferably includes a screw disposed in a housing connected to the bottom portion of one support band and a series of thread slots on the bottom portion of the other support band. The screw and threads are capable of engagement so that driving the screw adjusts the diameter of the natural curvature of the bottom portion of the support bands when the slotted end of the one support band is disposed and threadably engaged with the screw in the housing. A hex head is incorporated at either end of the screw, allowing the support bands to be adjusted from either side.

It was an object of the present invention, therefore, to provide a non-metallic, corrosion resistant framing and mechanical support system for pipes or ducts.

It is another object of the present invention to provide a highly efficient fastening system which allows attachment to the strut support without the use of tools.

It is a further object of the present invention to provide a strut support system for use in corrosive application which is relatively inexpensive.

These and other objects and advantages of the present invention will become more apparent from the following detailed description when taken in conjunction with the attached drawings.

DETAILED DESCRIPTION OF THE PREFERRED EMBODIMENT

Figure 1:
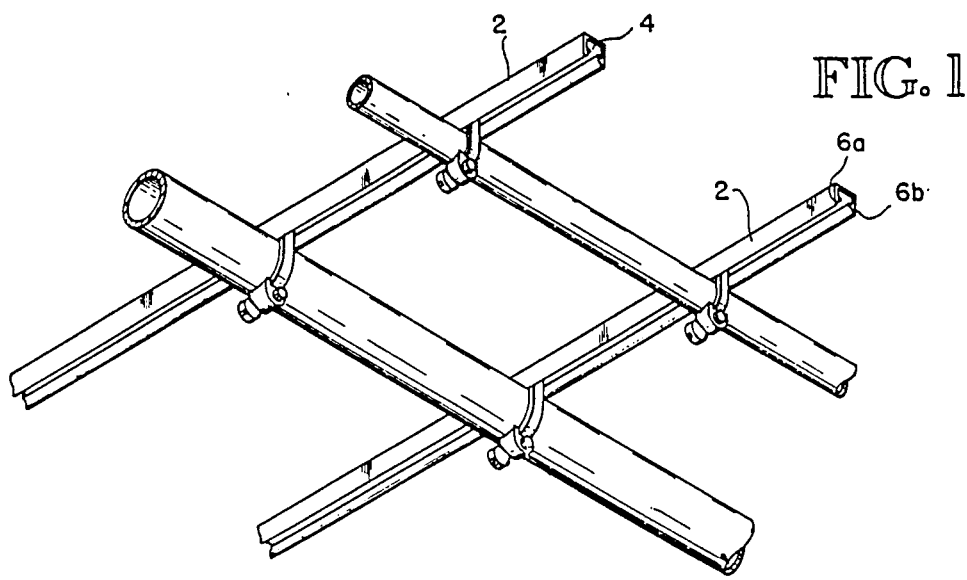
FIG. 1 is assembly application in accordance with the present invention.
Figure 2:
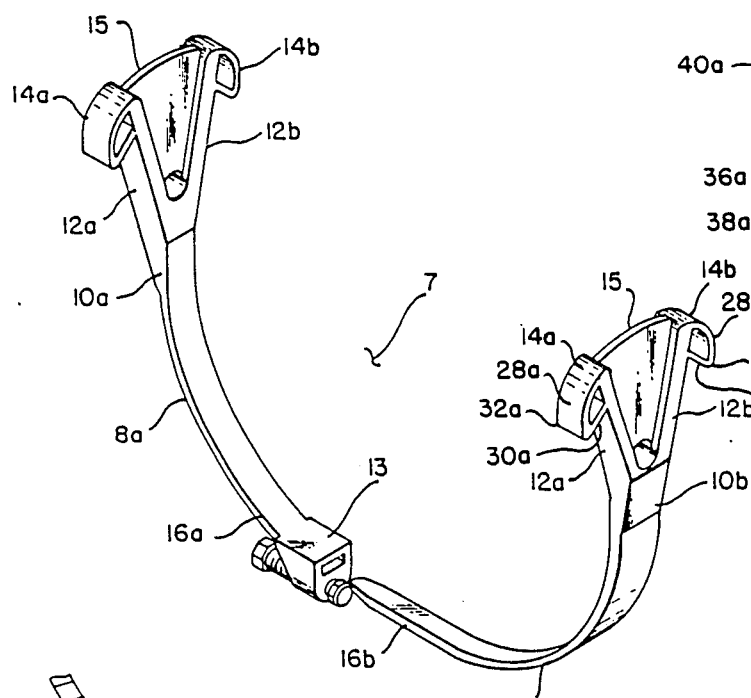
FIG. 2 is an elevation view of a support band of the present invention.

Referring to the FIG. 1, a pair of fiberglass channels 2 are shown. Channels 2 have longitudinal slots generally referred to as 4 and a pair of longitudinal flanges 6a and 6b. Flanges 6a and 6b project inwardly toward the center line of channel 2. Channel 2 is considered to be a structural support element for the entire strut system. Referring to FIG. 2, composite thermoplastic pipe supporting band generally designated as 7 is shown. Pipe supporting band 7 is comprised of a pair of supporting bands 8a and 8b used in the strut support system of the present invention. The complemental nature of this pair of support bands will be described subsequently.

Each of the pair of support bands 8a and 8b has a top portion, designated as 10a and 10b with two support members 12a and 12b. The support members 12a and 12b of support bands 8a and 8b have a pair of distal flanges 14a and 14b extending therefrom. The flanges 14a and 14b are used to engage the flanges 6a and 6b of the channel 2 when the strut system is in operation as shown best in FIG. 3. The top portions of each support band 8a and 8b has a web 15 with a hole 17. The support bands 8a and 8b also have bottom portions generally designated as 16a and 16b. The bottom portion 16a and 16b of the support bands 8a and 8b have a natural complemental curvature to allow cradling of a pipe (not shown) when the ends of support band 8 are engaged. The bottom portion 16a of the support band 8a has a housing 13 with a screw 20 disposed therein. The bottom portion 16b of the other support band 8b has a series of thread slots designated as 22 (see FIG. 4) capable of threadable engagement with the threads 24 of screw 20. The housing 13 is adapted to receive the slots 22 of support band 8b when locking and tightening of the support system is desired during operation. A hex 26 is molded on the end of screw 20 to allow adjustment of the support bands from the end opposite the head of screw 20.

In operation, the longitudinal channel 2 is appropriately hung in place, being supported to a ceiling (not shown) or the like by suitable conventional means. Each of the support bands 8a and 8b are manipulated by hand so that flanges 14a and 14b of top portion 10 of the support bands 8a and 8b are made to engage with flanges 6a and 6b of channel 2. A pipe to be supported is placed between the pair of bands 8a and 8b so that the curvature of the band 8a containing the bolt 20 and housing 18 is directed toward the curvature of band 8b containing the slots 22. The bottom portion of the band 8b is then pushed through the housing 18 contained on the other band 8a until the slots 2 engage threads 24. The pair of bands 8a and 8b can now be finally adjusted by driving the screw 20 with a screwdriver (not shown) or the like until the desired tightness around the pipe is achieved. Alternatively, hex 26 can be driven to achieve the desired adjustment. The hex 26 gives the support system added flexibility with respect to access of an operator in adjusting the system. The strut system can be used with any size pipe or ducting by increasing or decreasing the size of the channel 2 and the support bands 8a and 8b.

Figure 3:
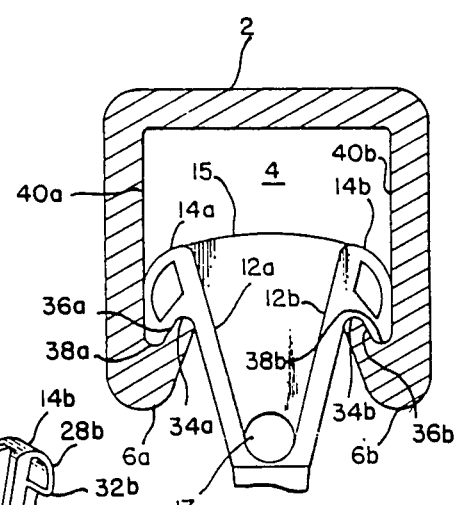
FIG. 3 is a sectional view of the support band and longitudinal channel partially in cross section in accordance with the present invention.
Figure 4:
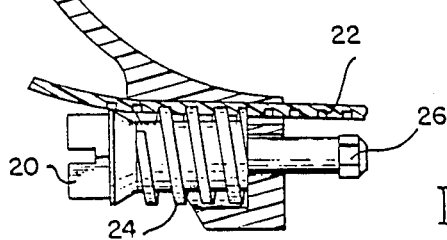
FIG. 4 is an elevation view in cross section of the support band showing the adjusting means.

Referring to FIGS. 2 and 3, the engagement of flanges 14a and 14b, and channel 2, as shown in that figure can be described. From FIG. 2 it should be noted initially that flanges 14a and 14b have side portion 28a and 28b, undersides 30a and 30b, and rounded bottom edges 32a and 32b. From FIG. 3, longitudinal flanges 6a and 6b have rounded edges 34a and 34b. The interior surfaces 36a and 36b of flanges 6a and 6b have rounded portions 38a and 38b where the flanges 6a and 6b meet the sides 40a and 40b of channel 2. When flanges 14a and 14b engage 6a and 6b, substantially full and interlocking contact occurs (as shown in FIG. 3) between the side portion 28a and 28b of the distal flanges 14a and 14b, and the sides 40a and 40b of the channel 2. This contact or engagement also includes the undersides 30a and 30b of flanges 14a and 14b, including rounded edges 32a and 32b and the interior surfaces 36a and 36b of flanges 6a and 6b including rounded portions 38a and 38b, and rounded edges 34a and 34b. The radii of rounded edges 32a, 32b and 34a, 34b will depend on the size of pipe to be supported.

As an alternative to web 15, a cross element (not shown) could be used. This element would extend between the distal flanges 14a and 14b. In operation in very tight spaces, web 15 or the cross element can be severed allowing easier manipulation of the flanges 14a and 14b into engagement with flanges 6a and 6b.

The invention may be embodied in other forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of claims are therefore intended to be embraced therein.

What I claim is:

1. In combination:
   a. a fiberglass structural support element having sides forming a longitudinal slot;
   b. longitudinal flanges inwardly projecting toward the center line of said support element along the sides of said support element, each of said longitudinal flanges having an interior surface ajacent said slot, said interior surface of said longitudinal flanges having a rounded portion where said longitudinal flanges meet the sides of said support element, said longitudinal flanges having rounded edges of a predetermined radius;
   c. a pair of complemental composite thermoplastic pipe supporting bands having bottom portions forming a natural curvature for cradling a pipe when the end of said bands are engaged, said supporting bands having a top portion integral with said bottom portion, said top portion having distal flanges, said distal flanges having side portions, undersides, rounded bottom edges of a pre-determined radius, and otherwise so shaped as to allow substantially full and interlocking contact between the side portion of said distal flanges and the sides of said support element and between the undersides of said distal flanges, including their rounded edges and the interior surface of said longitudinal flanges including the rounded portions of said longitudinal flanges where said longitudinal flanges meet the sides of said support element, and the rounded edges of said longitudinal flanges when the top portion of said support bands is disposed within said longitudinal slot; and
   d. adjustable holding means on the bottom portion of said supporting bands for connecting and locking said support bands around a pipe.

* * * * *